United States Patent
Leaming (10) Patent No.: US 8,234,421 B2
(45) Date of Patent: Jul. 31, 2012

(54) SMART CARD WITH SELECTIVELY ALLOCATABLE DATA BUFFERS AND ASSOCIATED METHODS

(75) Inventor: Taylor J. Leaming, Austin, TX (US)

(73) Assignee: STMicroelectronics, Inc., Coppell, TX (US)

( * ) Notice: Subject to any disclaimer, the term of this patent is extended or adjusted under 35 U.S.C. 154(b) by 423 days.

(21) Appl. No.: 10/828,948

(22) Filed: Apr. 21, 2004

(65) Prior Publication Data

US 2005/0240689 A1  Oct. 27, 2005

(51) Int. Cl.
*G06F 5/00* (2006.01)
(52) U.S. Cl. .............................. 710/52; 710/56; 711/170
(58) Field of Classification Search .................. 711/172, 711/170; 710/52, 56, 8, 74
See application file for complete search history.

(56) References Cited

U.S. PATENT DOCUMENTS

| | | | | |
|---|---|---|---|---|
| 5,166,903 A * | 11/1992 | Aichelmann, Jr. | ....... | 365/189.03 |
| 5,200,600 A * | 4/1993 | Shinagawa | ..................... | 235/492 |
| 5,568,179 A * | 10/1996 | Diehl et al. | ................... | 725/143 |
| 5,623,637 A * | 4/1997 | Jones et al. | ................... | 711/164 |
| 6,006,303 A | 12/1999 | Barnaby et al. | .............. | 710/244 |
| 6,016,549 A * | 1/2000 | Matsushiba et al. | .......... | 713/324 |
| 6,075,723 A * | 6/2000 | Naiki et al. | .......... | 365/185.03 |
| 6,122,676 A | 9/2000 | Brief et al. | ........................ | 710/9 |
| 6,157,966 A | 12/2000 | Montgomery et al. | .......... | 710/8 |
| 6,157,975 A | 12/2000 | Brief et al. | .................... | 710/104 |
| 6,402,026 B1 | 6/2002 | Schwier | ....................... | 235/379 |
| 6,439,464 B1 | 8/2002 | Fruhauf et al. | ................ | 235/492 |
| 6,463,537 B1 | 10/2002 | Tello | ............................ | 713/182 |
| 6,523,081 B1 | 2/2003 | Karlsson et al. | .............. | 710/305 |
| 6,536,670 B1 * | 3/2003 | Postman et al. | ............... | 235/487 |
| 6,547,150 B1 | 4/2003 | Deo et al. | ...................... | 235/492 |
| 6,581,122 B1 * | 6/2003 | Sarat | ............................. | 710/301 |
| 6,643,725 B1 * | 11/2003 | Kozakai et al. | ............... | 710/300 |
| 6,694,399 B1 * | 2/2004 | Leydier et al. | ................ | 710/301 |
| 6,805,297 B2 * | 10/2004 | Okaue et al. | .................. | 235/492 |
| 6,842,818 B2 * | 1/2005 | Okamoto et al. | ............. | 710/307 |
| 6,882,568 B2 * | 4/2005 | Shiota et al. | ............. | 365/185.08 |
| 6,938,143 B2 * | 8/2005 | Le | ................. | 711/172 |
| 7,003,597 B2 * | 2/2006 | Georgiou et al. | .............. | 710/56 |
| 7,155,727 B2 * | 12/2006 | Elving | .......................... | 719/312 |
| 7,272,675 B1 * | 9/2007 | Paul et al. | ....................... | 710/52 |

(Continued)

FOREIGN PATENT DOCUMENTS

EP        1 132 824       * 12/2001

(Continued)

OTHER PUBLICATIONS

Information Technology-Identification Cards-Integrated Circuit(s) cards with Contacts, part 12: USB Interface and Operating Procedures, ISO/IEC 2002, pp. 1-19.

(Continued)

*Primary Examiner* — Chun-Kuan Lee
*Assistant Examiner* — Ernest Unelus
(74) *Attorney, Agent, or Firm* — Allen, Dyer, Doppelt, Milbrath & Gilchrist, P.A.

(57) ABSTRACT

An integrated circuit for a smart card includes a plurality of data buffers and a processor. In particular, the processor selectively allocates data buffers from the plurality thereof and exchanges data therewith based upon different types of data. As such, the processor advantageously changes the allocation of the buffers for different data types based upon various bandwidth constraints in a particular smart card environment to enhance bandwidth utilization.

28 Claims, 7 Drawing Sheets

U.S. PATENT DOCUMENTS

| | | | |
|---|---|---|---|
| 7,307,998 B1* | 12/2007 | Wang et al. | 370/412 |
| 7,382,793 B1* | 6/2008 | Sindhu et al. | 370/412 |
| 7,418,344 B2* | 8/2008 | Holtzman et al. | 701/301 |
| 8,009,561 B1* | 8/2011 | Sindhu et al. | 370/230 |
| 2001/0056513 A1 | 12/2001 | Ueda | 710/100 |
| 2001/0056539 A1* | 12/2001 | Pavlin et al. | 713/193 |
| 2002/0066791 A1 | 6/2002 | Leydier et al. | 235/492 |
| 2002/0120800 A1* | 8/2002 | Sugahara et al. | 710/260 |
| 2002/0178338 A1* | 11/2002 | Shibuya et al. | 711/173 |
| 2003/0056050 A1* | 3/2003 | Moro | 710/301 |
| 2003/0145141 A1* | 7/2003 | Chen et al. | 710/74 |
| 2004/0006654 A1* | 1/2004 | Bando | 710/1 |
| 2004/0030818 A1* | 2/2004 | Chen et al. | 710/74 |
| 2004/0065744 A1* | 4/2004 | Shiraishi et al. | 235/492 |
| 2005/0108571 A1* | 5/2005 | Lu et al. | 713/201 |
| 2005/0178833 A1* | 8/2005 | Kisliakov | 235/441 |
| 2005/0192935 A1* | 9/2005 | Rajamani et al. | 707/3 |

FOREIGN PATENT DOCUMENTS

| | | |
|---|---|---|
| WO | 00/16255 | 3/2000 |
| WO | 02/23357 | 3/2002 |

OTHER PUBLICATIONS

Anderson, Universal Serial Bus System and Architecture, Chapter 3: The Big Picture, 1997, pp. 45-46.

Garney et al., USB Hardware and Software, Chapter 11: USB Device Framework, p. 305-310.

\* cited by examiner

SMART CARD WITH SELECTIVELY ALLOCATABLE DATA BUFFERS AND ASSOCIATED METHODS

FIELD OF THE INVENTION

The present invention relates to the field of information processing and storage, and, more particularly, to smart cards and related methods.

BACKGROUND OF THE INVENTION

Smart cards are becoming increasingly more popular for security and personal identification applications. For example, smart cards are currently used for storing sensitive data such as medical records, banking information, etc. In perhaps their most common form, smart cards have a card body which resembles a credit card in size, shape, and thickness, and they may even be made out of similar materials, such as plastic. Yet, rather than simply having a magnetic stripe to store sensitive information (e.g., account numbers, user identification, etc.) as standard credit cards do, smart cards generally include an integrated circuit (IC). The IC not only includes a non-volatile memory for storing such sensitive information, but it may also include a microprocessor for processing this information and communicating with a host device via a card reader, for example. Accordingly, not only can smart cards store more information than magnetic stripe cards, but they also have much greater functionality.

Various protocols have emerged to standardize smart card operation and communications. One of the earliest of these was developed by the International Organization for Standardization (ISO) and is known as the ISO 7816-X protocol. In particular, this protocol is set forth in ISO documents ISO 7816-1 (Physical Characteristics), ISO 7816-2 (Dimensions and Locations of Contacts), ISO 7816-3 (Electronic Signals and Transmission Protocols), ISO 7816-10 (Electronic Signals and Answer to Reset for Synchronous Cards), and ISO 7816-12 (USB Interface), for example, all of which are hereby incorporated herein in their entirety by reference.

Furthermore, in response to the increasing popularity of the universal serial bus (USB) architecture, increasing numbers of smart cards continue to be developed which operate in accordance with the USB protocol. This protocol is set forth in the Universal Serial Bus Specification, Revision 2.0, Apr. 27, 2000, published by USB Implementers Forum, Inc., which is hereby incorporated herein in its entirety by reference. The USB architecture is particularly advantageous in that it provides a standard "plug and play" interface for devices external to a computer, for example. That is, external peripheral devices can be relatively quickly and easily installed and removed from a computer without having to open or power down the computer.

With the ever increasing complexity of applications which are now being implemented using smart cards, these applications correspondingly require significantly higher volumes of data to be transmitted between the smart card and the host device to which it is connected. Accordingly, the ability of a smart card to efficiently buffer this data is important to minimize "bottlenecking" of the data and, thus, underutilization of bus bandwidth and a degradation of system performance.

With respect to the USB environment, there are four types of data transfer modes defined by the USB Specification, namely control mode transfers, bulk mode transfers, interrupt mode transfers, and isochronous mode transfers. While control mode transfers typically involve fairly small amounts of data, the other types of transfers may involve relatively large amounts of data. Moreover, many smart card applications require the use of more than one type of transfer mode, and USB smart cards can run more than one application at a time. Further, the USB Specification defines three data transfer rates that may be used for data transfer, namely low speed (1.5 Mb/s), full speed (12 Mb/s), and high speed (480 Mb/s). As such, the use of the larger volume data transfer modes and higher data transfer rates can significantly complicate the task of data buffering.

Various prior art schemes have been used for buffering data in smart cards, which will now be described with reference to FIGS. 5-11. It should be noted that reference numerals separated by decades in these figures are used to indicate similar elements in the different embodiments (e.g., the buffer 51a is similar to the buffer 61a, etc.). One basic prior art smart card data buffer circuit 50 includes an array of buffers 51a, 51b, and control/gating logic 52 for gating data into and/or out of the storage element array. As illustratively shown, the data buffer circuitry 50 is used for buffering data sent "downstream" from a host device to the smart card via a smart card adapter, for example.

Figure 6:
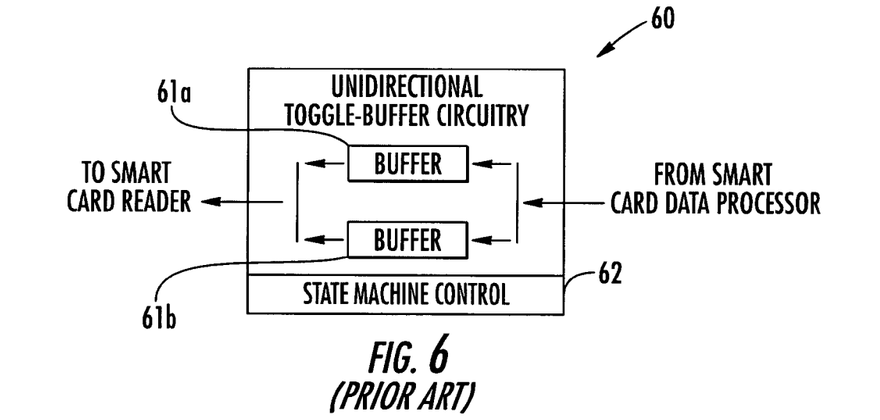

A similar buffer circuit 60 for buffering upstream data (i.e., data sent from the smart card to the host device) is illustratively shown in FIG. 6. The buffers 51a, 51b and 61a, 61b may be implemented with a set of registers, a block of consecutive RAM memory locations, a circular FIFO, or other suitable storage elements, as will be appreciated by those skilled in the art. The pairs of buffers 51a, 51b and 61a, 61b are used in tandem, typically in a "ping-pong" (a.k.a. "toggle buffer") arrangement so that a continuous flow of serial data is not interrupted, resulting in loss of data.

Figure 5:
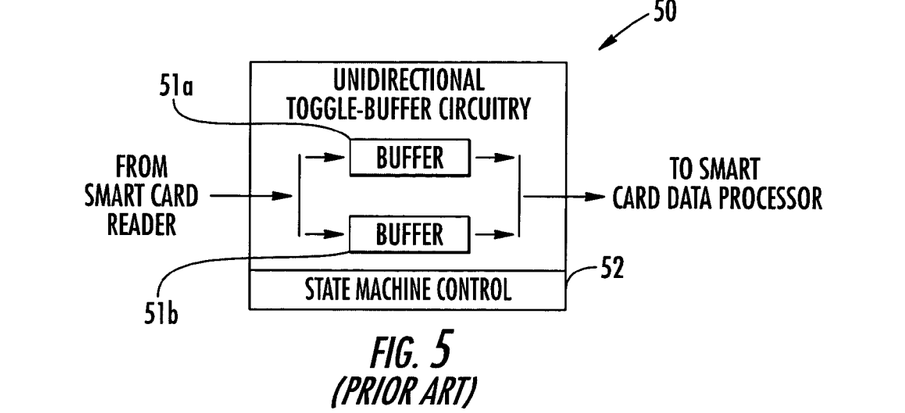
FIGS. 5-12 are schematic block diagrams illustrating various prior art data buffer configurations for smart cards.

The buffer circuits 50, 60 are designed so that the buffers 51a, 51b and 61a, 61b are used in coordinated fashion, and so that newly received (or sent) data does not overwrite previously received (or sent) data, until it is safe to do so. The control/gating logic 52, 62 may be implemented with simple Boolean logic in some embodiments or a more complex state machine in other embodiments, as illustrated in FIGS. 5 and 6, and it may be synchronous or asynchronous, as needed.

Figure 7:
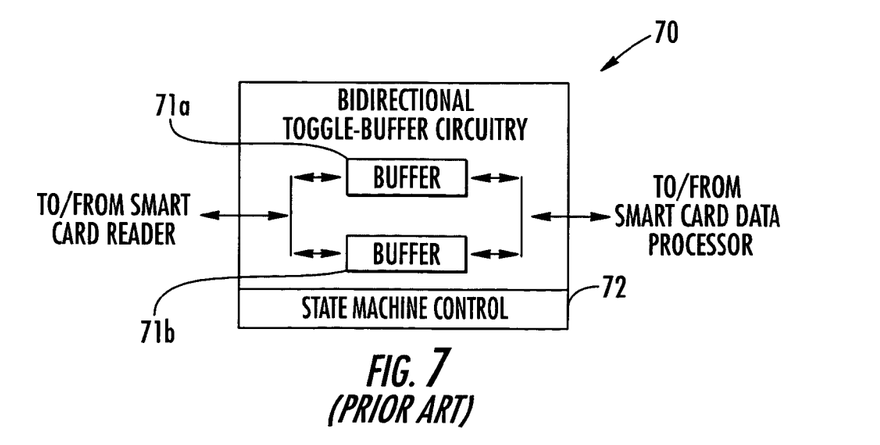

The above-described unidirectional buffering schemes are generally inadequate for the relatively high volume requirements of USB data transmission due to the bi-directional nature of USB data transfers. Accordingly, another type of data buffer circuit 70 which has been used in some implementations includes bi-directionally accessible buffers 71a, 71b. This configuration allows data to be passed from a USB host to a USB smart card and vice-versa, without using both sets of the buffer elements 51a, 51b and 61a, 61b. This results in cost-savings, and meets the needs of some less data-intensive applications. For example, this configuration often performs satisfactorily for USB low speed control data transfers, where a single data packet payload having a maximum of thirty-two bytes is used.

Even so, a limit will eventually be reached at which the bi-directional toggle buffer circuit 70 becomes inadequate for use in smart card USB Devices. This limit begins to emerge as the transition from control mode to the other three data transfer modes noted above is made to increase the data throughput between the host device and the USB smart card device. This limit is also evident when the data transfer speeds are increased from low speed to full or high speed.

Figure 8:
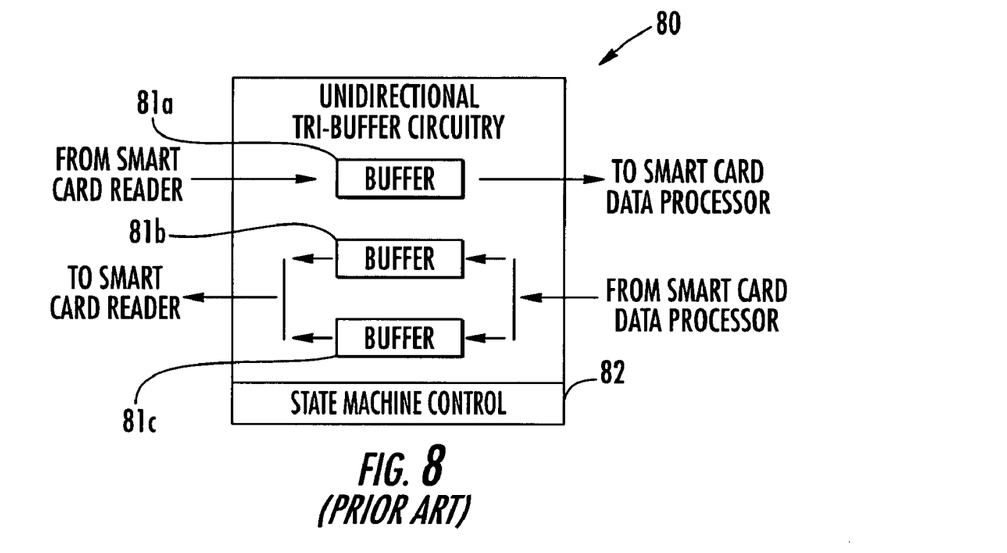
Figure 9:
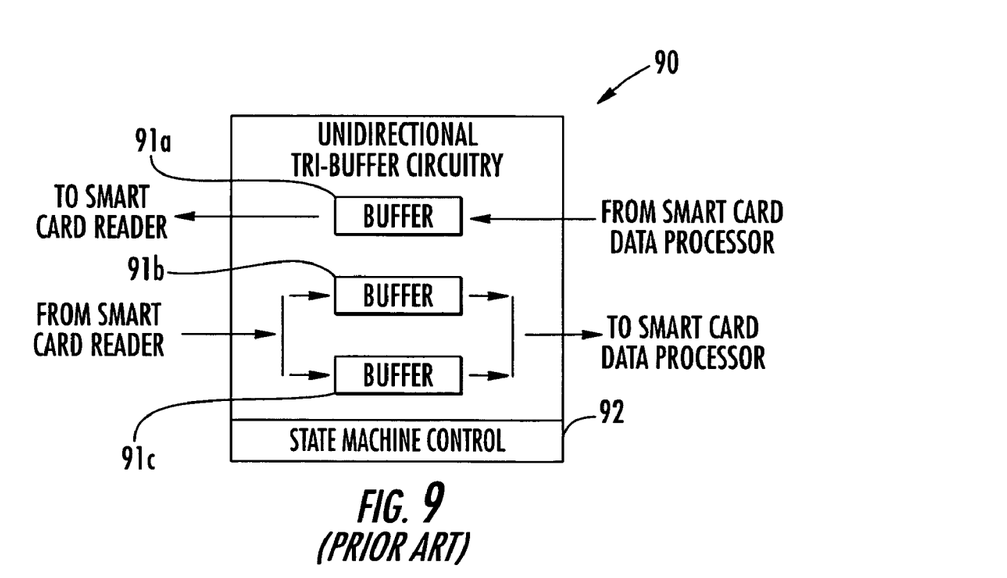
Figure 10:
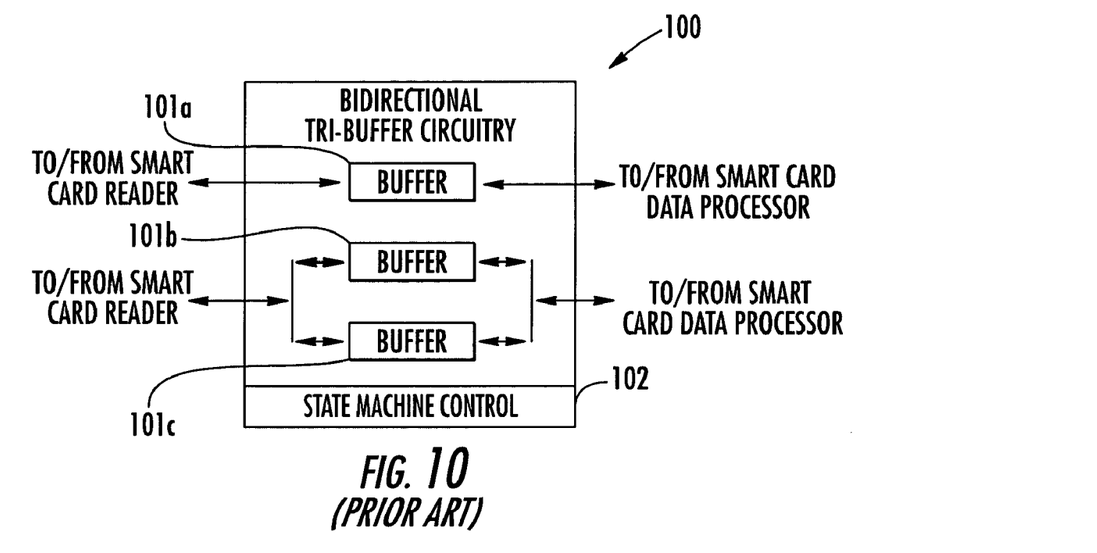

Accordingly, other prior art buffer circuits 80, 90 respectively illustrated in FIGS. 8 and 9 have been used in some implementations as well. With the buffer 80 a dedicated buffer element 81a buffers incoming (i.e., downstream) data, and a pair of buffers 81b, 81c buffer outgoing data, and vice-versa with the buffer circuit 90. In other words, the illustrated configurations are unidirectional tri-buffer schemes. A similar bi-directional tri-buffer scheme is implemented in the buffer circuit 100 illustratively shown in FIG. 10.

Figure 11:
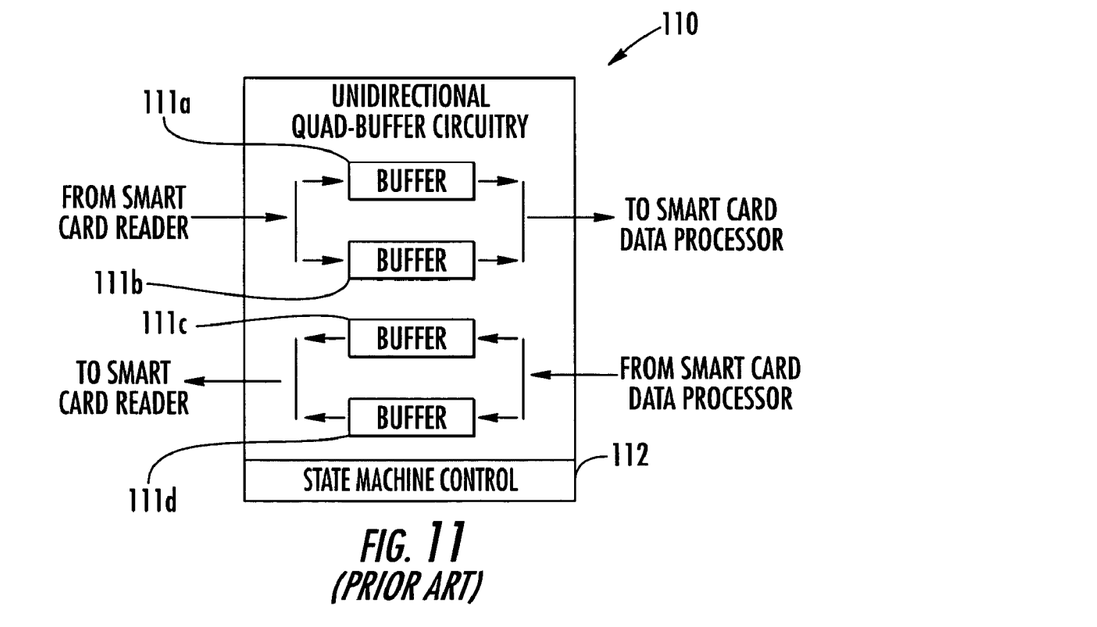
Figure 12:
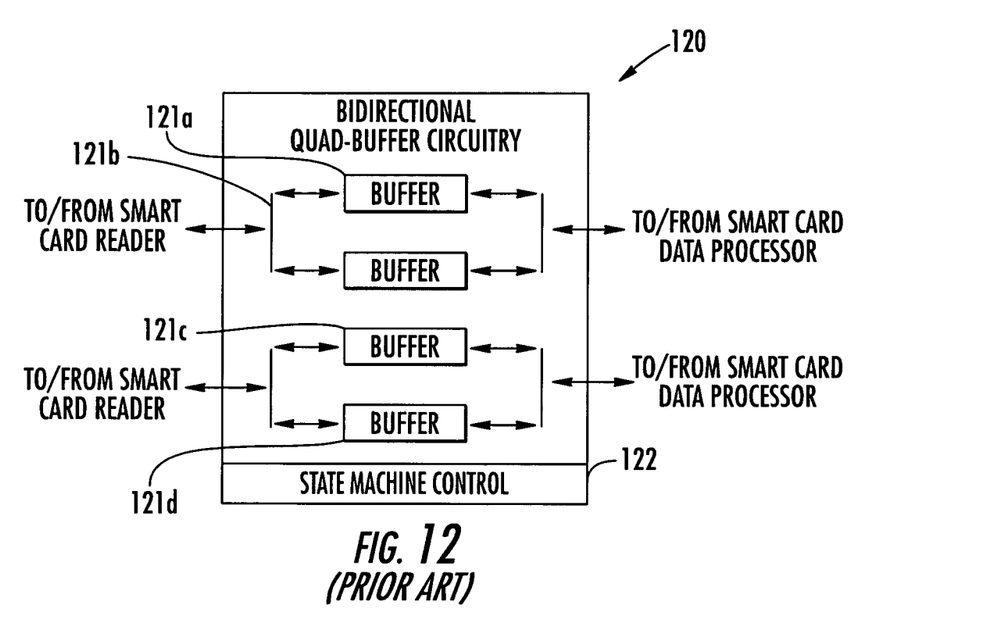

Other prior art variations of the above-noted buffer circuits are illustratively shown in FIGS. 11 and 12. In particular, the data buffer circuit 110 implements a unidirectional quad-buffer element scheme, while the buffer circuit 120 implements a bi-directional quad-buffer element scheme. Here again, depending on the nature of the data streaming needed, implementing such buffer configurations may result in a significant increase in circuit complexity and costs. In other words, replicating pairs of buffers increases the cost and complexity of implementation. This is particularly so when two or more OUT endpoints are used to support in excess of 64 bytes of data payload per transaction. As such, data buffering still remains a significant obstacle to achieving high levels of sustainable bandwidth utilization in smart card devices.

SUMMARY OF THE INVENTION

In view of the foregoing background, it is therefore an object of the present invention to provide an integrated circuit, such as for a smart card, which provides enhanced data buffering and related systems and methods.

This and other objects, features, and advantages in accordance with the present invention are provided by an integrated circuit for a smart card which may include a plurality of data buffers and a processor. In particular, the processor may selectively allocate data buffers from the plurality thereof and exchange data therewith based upon different types of data. As such, the processor may advantageously change the allocation of the buffers for different data types based upon various bandwidth constraints in a particular smart card environment to enhance bandwidth utilization.

More particularly, each type of data may correspond to one of a plurality of endpoints supported by the processor. For example, USB devices support a number of endpoints for each of the applications they run, and the buffers may be allocated based upon the particular requirements of the given endpoints. One such requirement is a bandwidth allocation that a host device will associate with or assign to the various endpoints upon initialization of the integrated circuit therewith. Thus, the processor may selectively allocate the data buffers based upon the bandwidth allocations of the endpoints.

Moreover, each endpoint may be associated with one of a plurality of data transfer modes. In the case of a USB system, these data transfer modes are the control mode, interrupt mode, bulk mode, and isochronous mode, as noted above. Accordingly, the processor may selectively allocate the data buffers based upon the data transfer mode associated with the endpoints.

In addition, the processor may further selectively allocate the data buffers based upon a direction of data transfer (i.e., whether the data is being transferred from or to the processor), and/or a usage status of the buffers (i.e., whether they are in use or not). Also, the processor may selectively allocate at least some (i.e., more than one) of the plurality of data buffers with one of the data types. These buffers may either be contiguous or non-contiguous as needed.

Further, when more than one buffer is allocated for a particular type of data or endpoint, the processor may also exchange invalid data with one (or more) of these buffers to provide enhanced security. The processor may include buffer status circuitry for collecting buffer status information for the plurality of buffers, such as that described above, and a controller for selectively allocating the data buffers based upon the buffer status information. The buffers may be bi-directional buffers, for example, although unidirectional buffers could also be used. As noted above, the processor may operate in a USB mode, or in accordance with other smart card operational formats (ISO 7816, etc.).

A smart card in accordance with the present invention may include a smart card body and an integrated circuit carried by the smart card body, such as the integrated circuit described briefly above. Moreover, such a smart card may be used in a smart card system in accordance with the present invention further including a host device and a smart card adapter connected to the host device.

A method aspect of the invention is for buffering data in an integrated circuit for a smart card including a plurality of data buffers and a processor connected thereto. The method may include selectively allocating data buffers from the plurality thereof and exchanging data between the plurality of data buffers and processors based upon different types of data.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
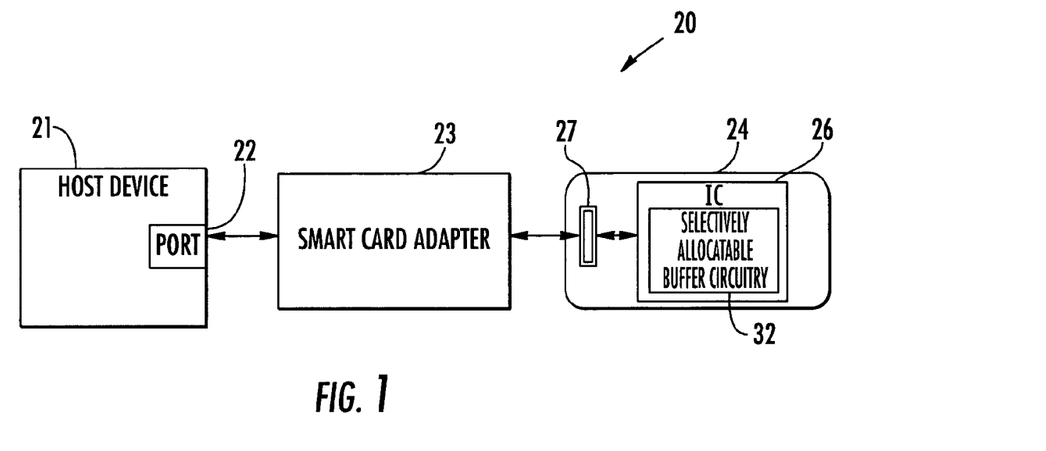
FIG. 1 is schematic block diagram of a smart card system in accordance with the present invention.

Referring initially to FIG. 1, a smart card system 20 in accordance with the present invention illustratively includes a host device 21 having a communications port 22, a smart card adapter (or reader) 23 connected to the communications port, and a smart card 24 for communicating with the host device via the smart card adapter. Generally speaking, the host device 21 will be a computer of some type, which could be a personal computer (PC), laptop, etc., for example.

Of course, smart card systems take many forms, so the host device 21 could be any number of computing devices capable of interfacing with a smart card, such as a cable or satellite television receiver/decoder, an automated teller machine (ATM) or other banking machine, a point-of-sale (POS) device (e.g., a cash register), etc., depending upon the given application. Another example would be a personal data assistant (PDA) or other USB device that is ordinarily a slave to a USB bus master (i.e., host), but when used in a USB on-the-go (OTG) mode can itself act as a limited USB bus master.

In the case of an ISO 7816 type smart card system, the port 22 may be a serial communications port connected to the internal bus of the host device 21 (not shown). In the case of a USB type smart card system, the port 22 will be a USB port which is also connected to the internal bus of the host device 21, as will be appreciated by those of skill in the art. The smart card system 20 may advantageously be implemented as an ISO 7816 type system, a USB system, or a dual mode system which operates in both modes, for example, similar to the system described in U.S. Pat. No. 6,439,464 to Fruhauf et al., assigned to the assignee of the present invention, and which is hereby incorporated herein in its entirety by reference. Of course, other suitable smart card formats may also be used, as will be appreciated by those of skill in the art.

The smart card adapter 23 is of a type compatible with the particular operational protocol being implemented in the system 20 (e.g., an ISO 7816 type card reader, a USB type "hub" adapter, etc.). Of course, multiple adapters 23 may be used, as well as multi-purpose readers which read more than one type of smart card or multi-mode smart cards. In addition, the card adapter 23 can be remotely located with respect to the host device 21, but it need not be. That is, in some embodiments the card adapter 23 can be incorporated within the host device 21 or carried by a housing thereof, as will be appreciated by those of skill in the art. Additionally, in some embodiments the smart card adapter 23 may be incorporated into a smart card integrated chip (see below), reducing the adapter to little more that a "pass through" connector.

The smart card 24 illustratively includes a card body 25 and an integrated circuit (IC) 26 carried by the card body. Further, the smart card also illustratively includes contacts 27 for providing an electrical connection between the smart card adapter 23 and the IC 26. Of course, it will be appreciated that in some embodiments the smart card 24 may be wireless and thus not require the contacts 27. In such event, an antenna may be used instead of the contacts 27, for example. Yet, for clarity of explanation, the present application will refer particularly to the examples of ISO 7816 and USB type smart cards, each of which uses a respective connector configuration defined by the various protocol documents noted above. Thus, the use of physical contacts 27 on the card body 25 (and corresponding contacts at the card adapter 23) will be assumed for purposes of the present discussion.

It should be noted that the smart card body 25 may be made of various types of materials and take various shapes. Perhaps the most common material used for smart cards is plastic, but other suitable materials may also be used. Moreover, smart cards are also generally rectangular in shape and thin enough to fit in a wallet, similar to a credit card, but again, other shapes and thicknesses may be used. The IC 26 may be encased within the card body 25, as illustratively shown, or it may be recessed therein but still exposed. Other mounting configurations are possible, as will be appreciated by those of skill in the art, which are anticipated by the present invention. It should also be noted that the smart card 24 may be incorporated or built into another device as a token or identification circuit therefor, for example.

Figure 2:
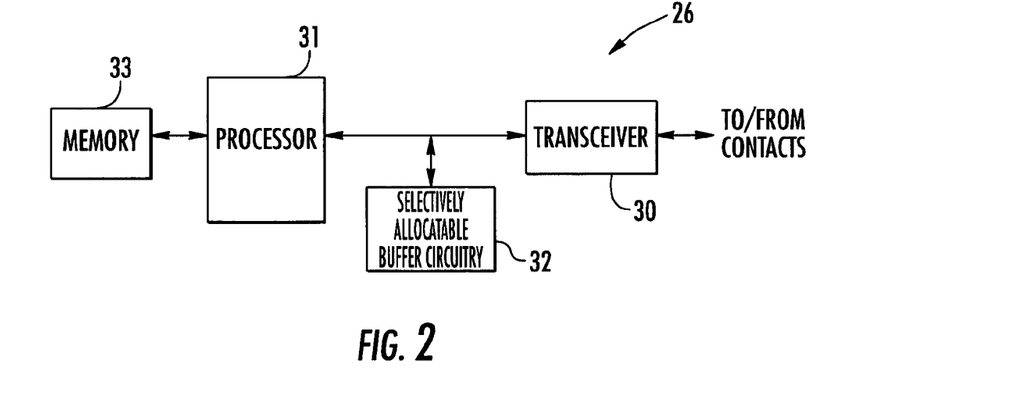
FIG. 2 is schematic block diagram illustrating the smart card integrated circuit of the smart card of FIG. 1 in greater detail.

Turning now to FIG. 2, the basic components of the IC 26 will now be described. In particular, the IC 26 includes a transceiver 30 which is connected to the contacts 27 and sends/receives signals to/from the host device 21 via the smart card adapter 23, as will be appreciated by those of skill in the art. The transceiver 30 is controlled by a processor 31 which also performs the various smart card operations, as will be discussed further below. Furthermore, buffer circuitry 32 is included within the IC 26 for buffering signals transmitted between the IC and the host device 21. Further, a card memory 33 is also typically included for storing various data for processing by the processor 31.

Figure 3:
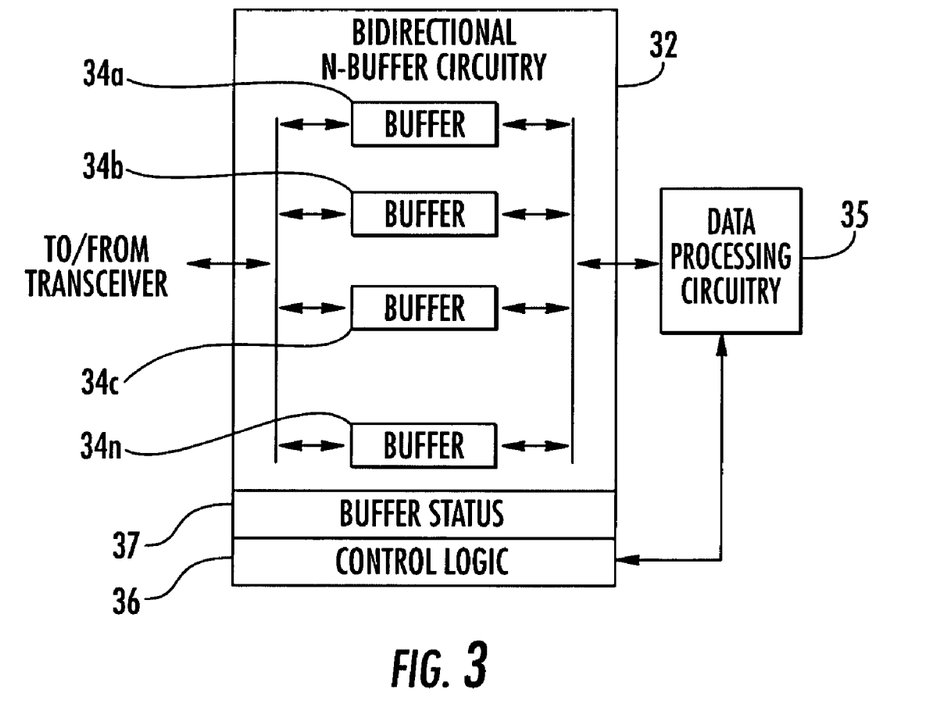
FIG. 3 is schematic block diagram illustrating in greater detail the buffer circuitry of the smart card integrated circuit of FIG. 2.

Referring now more particularly to FIG. 3, an exemplary embodiment of the buffer circuitry 32 and processor 31 in accordance with the present invention will now be described in further detail. In particular, the buffer circuitry 32 illustratively includes a plurality N of buffers $34a$-$34n$. The buffers $34a$-$34n$ may include any suitable storage devices such as registers, blocks of consecutive RAM memory locations, circular first-in first-out (FIFO) devices, or other suitable storage elements, as will be appreciated by those skilled in the art. In the illustrated embodiment, the buffer elements $34a$-$34n$ are bi-directional buffers, although unidirectional buffers may also be used. They may also be synchronous or asynchronous.

In accordance with the invention, the processor 31 selectively allocates data buffers from the plurality thereof and exchanges data therewith based upon different types of data. More particularly, the processor 31 illustratively includes data processing circuitry 35 which exchanges data with the buffers $34a$-$34n$, which is either used by or generated by the various smart card applications which are run by the data processing circuitry. That is, the processing circuitry 35 selectively exchanges both downstream data (i.e., data coming from the host device 21 to be processed by the data processing circuitry) and upstream data (i.e., data being sent to the host device from the data processing circuitry) with selectively allocated ones of the buffers $34a$-$34n$ based upon the particular data type being exchanged.

To perform the selective allocation of the buffers $34a$-$34n$, the processor 31 also illustratively includes a controller/control logic 36. That is, the control logic 36 allocates different buffers $34a$-$34n$ for buffering different types of data. If the IC 26 is to be used with a USB system, for example, each type of data may correspond to one of a plurality of endpoints supported by the data processing circuitry 35. As will be appreciated by those of skill in the art, all USB devices have a hierarchy of descriptors which describe to the host device information such as device type, the number of configurations the device can have, the number of interfaces or applications the device runs for each configuration, and the number of endpoints associated with each interface.

An endpoint may conceptually be thought of as a link or pipeline used to access a specific function associated with a given application. Thus, if the host device 21 wants to send a control request to the data processing circuitry 35 to have it perform a particular action by one of its applications, the host device would address this request to a designated control transfer endpoint for this application. Descriptors of the various endpoints supported by the processor 31 are communicated to the host device 21 during initialization or enumeration.

In a USB environment, the host device 21 operates as a master device and the USB devices connected thereto operate as slave devices. As such, the host device 21 is responsible for managing the bandwidth of the system bus. Accordingly, during enumeration the host device 21 will allocate the appropriate amount of bandwidth that may be used by the various endpoints of the processor 31, as will be appreciated by those of skill in the art. Thus, the data processing circuitry 35 will communicate the number of endpoints it supports, what types of endpoints they are, and/or the bandwidth allocated to each of these endpoints, which the controller 36 may then use to allocate the appropriate number of the data buffers needed for each of the endpoints to provide desired bandwidth utilization.

In particular, the controller 36 could designate more than one of the buffers $34a$-$34n$ for a given endpoint, such as a bulk transfer endpoint, which has been allocated a relatively large amount of bandwidth necessary for its data intensive function. Moreover, the controller 36 could allocate at least one designated buffer from among the buffers 34a-34n for each control and/or interrupt endpoint because it is typically important that data associated therewith be communicated as quickly as possible without significant buffering delays. As will be appreciated by those skilled in the art, numerous allocation combinations are possible depending upon the number of interfaces, endpoints, etc., in a particular application. It should be noted that the controller 36 may allocate any number of the buffers 34a-34n for one or more data types, and that the buffers need not be allocated in a contiguous fashion (although they can be).

Another usage of this application would be to allow the firmware (i.e., an embedded operating system (OS)) to directly manage allocation/deallocation of buffers based upon the current utilization of the device. The advantage of this flexibility allows the processor to change the buffer algorithm to optimize the buffer's usage (i.e., bandwidth, speed of the communication, etc.). By contrast, using a strictly hardware solution would make it difficult to find desired configurations for numerous environments (with respect to utilization of the USB smart card device). Such environments may include pay TV (i.e., a streaming application), mass storage (i.e., one-way token), banking and log-in (i.e., shared secret), etc.

Additionally, the processor 31 also includes buffer status circuitry 37 for collecting buffer status information for the plurality of buffers 34a-34n. For example, such buffer status information may include the direction in which a particular payload of data is being transferred (i.e., whether the data is being transferred from or to the data processing circuitry 35), and/or a usage status of the buffers (i.e., whether they are in use or not and how much they are being utilized). The controller 36 may further use this information to intermittently (or periodically) re-evaluate the allocation of the buffers 34a-34n and reallocate them as appropriate to enhance bandwidth utilization, as will be appreciated by those skilled in the art.

The buffer status circuitry 37 also preferably determines the endpoint address associated with the various groups of data being exchanged with the data processing circuitry 35. The controller 36 may then direct the data to those of the buffers 34a-34n which have been allocated therefor based upon the endpoint address, for example.

The prior art buffering schemes discussed above will likely require the duplication of multiple buffer sets to accommodate multiple endpoints for more advanced smart card implementations. This, in turn, results in a relatively large number of buffers which have to be included in the smart card integrated circuit, which can thus result in large integration area consumption and greater costs. Yet, the present invention advantageously provides for a flexible allocation of the buffers 34a-34n as appropriate for a given implementation to enhance bandwidth utilization. Accordingly, relatively fewer buffers may be used to provide comparable (or better) buffering and bandwidth utilization than the above-described prior art schemes in many implementations.

Of course, to provide this additional flexibility of buffer allocation, the complexity of the requisite controller/control logic 36 may be increased somewhat over prior art approaches. Even so, the savings provided in terms of semiconductor "real estate" that is needed to implement copies of toggle buffer pairs may be significant. By way of example, the control logic 36 and/or buffer status circuitry 37 may be implemented by a state machine for example, although other suitable circuitry may also be used, as will be appreciated by those of skill in the art.

Indeed, by using a suitably-designed controller 36, in conjunction with the appropriate number of buffer elements 34a-34n for a given smart card implementation, it is possible to relatively easily scale the buffer architecture without a dramatic increase in the needed die area or control logic as required by certain prior art schemes, as well as without their fixed constraints. Depending upon the intended application (s) of the smart card 24, the present invention thus allows the full range of USB transfer modes to be adequately supported with enhanced bus bandwidth utilization. Further, this may be done while still maintaining the needed throughput to service one or more simultaneous applications, each with one or more active endpoints, or even a very complex application in a very efficient and cost-effective fashion, as will also be appreciated by those skilled in the art.

One particularly advantageous aspect of the above-described buffering configuration of the present invention is that it may be used to provide enhanced security of data transmissions. In particular, with the introduction of USB to smart cards, new forms of attack become possible, as well as new ways to react to them. Given its inherent intelligence, a USB device can not only detect certain types of "attack" against the system by an eavesdropper or would-be hacker, for example, but it can also make decisions based upon its perceived level of attack. That is, a USB smart card device may be designed to observe unusual or inconsistent behavior occurring on the system bus and correlate such behavior to certain kinds of attacks.

Depending on the nature and severity of the perceived attack, the integrated circuit 26 may advantageously utilize the above-described ability to selectively allocate the buffers 34a-34n responsive thereto. By way of example, the integrated circuit 35 could react to a perceived attack by switching to a prearranged communications mode with the host device 21 for communicating data therewith, in which the actual or valid data is hidden within much larger payloads, for which several of the buffers 34a-34n will be allocated.

That is, invalid or "bogus" data would be inserted within the actual data for a given transaction or transfer at a location known by the processor 31 and host device 21. Thus, the invalid data may be ordered such that it can be readily stored into a designated buffer(s), which allows this data to be quickly discarded without the need to separate the valid data therefrom and potentially lose the valid data. While this will reduce the overall throughput somewhat, the enhanced security may be more desirable, particularly in situations when it is perceived that the smart card system 20 is under attack. Further security could also be provided by changing the designated invalid data buffer(s), such as an in a pseudorandom fashion using a key seed shared by the processor 31 and host device 21. This will cause the patterns of data payloads to differ on a continual basis, making hacking even more difficult.

Figure 4:
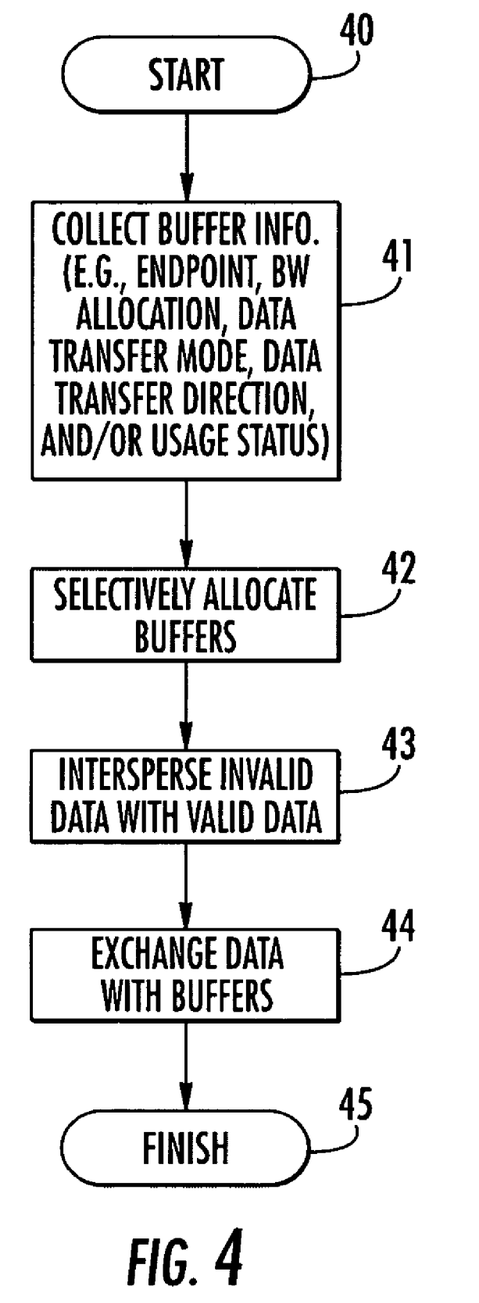
FIG. 4 is a flow diagram illustrating a method for buffering data in the integrated circuit of FIG. 3 in accordance with the present invention.

A method aspect of the invention will now be described with reference to FIG. 4. In particular, the method begins (Block 40) with collecting the requisite information for allocating the buffers 34a-34n, such as the number/bandwidth allocation/transfer modes of the supported endpoints, and/or buffer status information such as data transfer direction, usage, etc., as previously discussed above, at Block 41. The buffers 34a-34n are then selectively allocated by the controller 36 based thereon, at Block 42. Invalid data may then optionally be interspersed with the valid data if enhanced security is desired (Block 43), and the data selectively exchanged with the buffers 34a-34n, at Block 44, thus concluding the illustrated method (Block 45). Additional method aspects of the invention will be apparent to those skilled in the art in view of the foregoing and will therefore not be discussed further herein.

The foregoing will be further understood with reference to the following two examples of selective data buffer allocations in accordance with the present invention for USB smart cards. Both of the following examples are based upon a four buffer configuration, but it should again be noted that any number of buffers may be used in accordance with the present invention.

EXAMPLE 1

In a first exemplary configuration, a buffer 0 is used for all OUT transactions (e.g., endpoint 0 control transfer, endpoint 4 bulk out transfers, endpoint 5 interrupt out transfers). Furthermore, buffer 1 is used for endpoint 0 control transfers in the IN direction, buffer 2 is used for endpoint 1 bulk IN transfers, and buffer 3 is used for endpoint 2 interrupt IN transfers.

During an OUT transaction the USB host device 21 sends an OUT packet and associated data packet. By running the processor 31 faster than 12 Mbits/s, little or no bottlenecking may be achieved from OUT endpoints using this configuration. Furthermore, the processor 31 should have adequate time to copy the received bytes into the memory 33 (i.e., RAM). Accordingly, NACKs may thus be substantially avoided, and thus only one buffer need be used for OUT transactions in many applications.

Furthermore, during an IN transaction the USB host device 21 sends an IN packet and then expects an answer from the USB smart card 24. The appropriate IN buffer is preloaded to avoid an undue wait time (i.e., which would cause a NACK condition). As much data as possible is preferably preloaded for the IN transaction, and the acknowledgement should follow the occurrence of the IN packet.

For the above-described four buffer configuration, it will be appreciated that up to six endpoints may be managed with significantly no time delay limitations. Presently, most USB devices require less than six endpoints, so this exemplary configuration is well suited for most applications, and it also provides a good tradeoff in terms of integration area consumption.

EXAMPLE 2

The second exemplary configuration uses the buffers 2 and 3 for endpoint 2 bulk IN transfers, and the buffers 0 and 1 for endpoint 1 bulk OUT transfers. Here, the idea is to use the buffers in a toggle mode. For example, after an OUT packet, the buffer 0 is available but the buffer 1 is disabled. Data is then copied into the buffer 0, which subsequently becomes unavailable while the buffer 1 becomes available, etc.

The process will be similar for IN endpoints as well. That is, the buffer 2 is preloaded with data. When an IN packet arrives at the USB smart card 24, the buffer 2 becomes available. The data is then sent to the USB host device 21. During this transfer, the processor 31 loads the buffer 3. When an IN packet arrives at the USB smart card 24, the buffer 3 becomes available. The data is sent to the USB host device 21. During this transfer the processor 31 loads the buffer 2, etc. Of course, it will be appreciated that numerous other buffer configurations are possible in accordance with the present invention beyond the exemplary embodiments described above, which are provided merely for illustrational purposes.

The various features and advantages of the present invention will be further appreciated with reference to a brief discussion of some of the peculiarities and challenges unique to smart cards. In contrast to typical ISO, USB, etc., devices, smart cards (i.e., smart card ICs) are very secure (i.e., mechanically, physically, electrically, and programmatically). Moreover, smart card ICs have exceptionally few physical pathways between their die and the outside world.

Generally speaking, the flow of data into and out of the "core" of a smart card IC is very carefully managed by a USB Device Core (UDC), well-defined buffering, and through the use of an isolation mechanism (which may be thought of as a highly secure semiconductor (i.e., silicon) firewall). As such, the use of buffering for external communications (i.e., ISO, USB) is necessarily kept outside of this firewall for security reasons. Moreover, the internal CPU of a smart card IC has numerous security mechanisms built into its core to provide the highest possible security between resident applications (e.g., Java applets) and the embedded resources (e.g., RAM, ROM, NVRAM, mathematical mechanisms, encrypted data, particular CPU instructions and functionalities, etc.).

Not only do smart cards have a number of features to prevent observation and tampering from the outside world typically not found in other types of ISO, USB, etc. devices, they also embody well-tuned cores. These cores are generally capable of performing lengthy and complex cryptographic algorithms which can produce in minute fractions of a second results which would take typical computer systems many magnitudes more time, from minutes to hours, to even weeks or months.

Furthermore, smart card ICs are subject to many constraints that other ISO, USB, etc. devices (and also many other ICs) are not. For example, physical size is often a key limiting factor which effects cost, available RAM, etc. Other such constraints include minimal external connectivity requirements, electrical/power constraints, etc. Another important concern of smart cards is the timeliness and completeness with which requested data is generated.

It is in view of the foregoing constraints imposed on smart card ICs (i.e., the silicon firewall, the highly secure CPU core, the exclusive control of the CPU and OS over all else, the specialized internal machinery, the exhaustive memory protection schema, the various anti-spy, anti-tamper, anti-attack mechanisms, etc.) that the features of the invention can be fully appreciated. That is, all of the above constraints impose a significant burden upon smart card IC design, and this burden may be substantially reduced in accordance with the teachings of the present invention, as will be appreciated by those skilled in the art.

It should be further noted that, as used herein, "application" is intended to be broadly construed. For example, an application may be a process by which a specified resource is utilized. It may also refer to an operative piece/configuration of software that performs a specific task or set of tasks. As such, "applications" may run on a host device on top of the kernel and associated USB infrastructure (i.e., a custom application for viewing on-line financial information, to view a movie, listen to downloadable music, authenticate logging into a computer, etc.). In addition, applications can also take the form of embedded software programs which run under the robust embedded OS of the smart card. As with PC-based applications, embedded applications may be run concurrent with each other, and vie for various resources and services provided by the smart card and its OS.

Additional features of the invention may be found in copending applications entitled SMART CARD PROVIDING DATA MAPPING FOR MULTIPLE APPLICATIONS AND RELATED METHODS; Ser. No. 10/828,747; SMART CARD WITH SELF-RECONFIGURATION FEATURES AND RELATED METHODS; Ser. No. 19/829,007; and SMART CARD WITH SELF-DETACHMENT FEATURES AND RELATED METHODS, Ser. No. 10/829,008, the entire disclosures of which are hereby incorporated herein by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A smart card comprising:
   a smart card body; and
   an integrated circuit carried by said smart card body and comprising
       a plurality of data buffers, and
       a processor configured to collect buffer status information for said plurality of data buffers, selectively re-configure said plurality of data buffers on a continual ongoing basis for storing different types of data and exchange respective types of data therewith based upon the buffer status information, re-configuring said plurality of data buffers being based upon the buffer status information,
       the buffer status information comprising a usage status of said plurality of data buffers including a direction in which a particular payload of data is being transferred,
       said processor being configured to select a different one of a buffering algorithm from among a plurality of buffering algorithms to selectively re-configure said plurality of data buffers based thereon,
       each type of data corresponding to one of a plurality of endpoints supported by said processor, the endpoints having bandwidth allocations associated therewith,
       said processor being configured to further selectively re-configure said plurality of data buffers based upon the bandwidth allocations.

2. The smart card of claim 1 wherein each endpoint is associated with one of a plurality of data transfer modes, and wherein said processor is further configured to selectively re-configure said data buffers based upon the data transfer modes.

3. The smart card of claim 1 wherein said processor is configured to selectively re-configure at least some of said plurality of data buffers with one of the data types, and wherein said processor is configured to exchange invalid data with at least one of the at least some data buffers.

4. The smart card of claim 1 wherein said processor is configured to selectively re-configure at least some of said plurality of data buffers with one of the data types, and wherein said at least some data buffers are non-contiguous.

5. The smart card of claim 1 wherein said processor comprises:
   buffer status circuitry configured to collect buffer status information for said plurality of buffers; and
   a controller configured to selectively re-configure said plurality of data buffers based upon the buffer status information.

6. The smart card of claim 1 wherein said plurality of data buffers comprises a plurality of bi-directional buffers.

7. The smart card of claim 1 wherein said processor is configured to operate in a universal serial bus (USB) mode.

8. A smart card comprising:
   a smart card body; and
   an integrated circuit carried by said smart card body and comprising
       a plurality of data buffers, and
       a processor configured to collect buffer status information for said plurality of data buffers, selectively re-configure said plurality of data buffers on a continual ongoing basis for storing different types of data and exchange respective types of data therewith based upon the buffer status information, re-configuring said plurality of data buffers being based upon the buffer status information,
       the buffer status information comprising a usage status of said plurality of data buffers including a direction in which a particular payload of data is being transferred,
       each type of data corresponding to one of a plurality of endpoints supported by said processor, the endpoints having bandwidth allocations associated therewith,
       said processor being configured to further selectively re-configure said plurality of data buffers based upon the bandwidth allocations.

9. The smart card of claim 8 wherein each endpoint is associated with one of a plurality of data transfer modes, and wherein said processor is further configured to selectively re-configure said plurality of data buffers based upon the data transfer modes.

10. The smart card of claim 8 wherein said processor is configured to selectively re-configure at least some of said plurality of data buffers with one of the data types, and wherein said processor is configured to exchange invalid data with at least one of the at least some data buffers.

11. The smart card of claim 8 wherein said processor is configured to selectively re-configure at least some of said plurality of data buffers with one of the data types, and wherein said at least some data buffers are non-contiguous.

12. The smart card of claim 8 wherein said processor comprises:
   buffer status circuitry configured to collect buffer status information for said plurality of data buffers; and
   a controller configured to selectively re-configure said plurality of data buffers based upon the buffer status information.

13. The smart card of claim 8 wherein said plurality of data buffers comprises a plurality of bi-directional data buffers.

14. The smart card of claim 8 wherein said processor is configured to operate in a universal serial bus (USB) mode.

15. A smart card system comprising:
   a host device;
   a smart card adapter connected to said host device; and
   a smart card for communicating with said host device via said smart card adapter and comprising a smart card body and an integrated circuit carried by said smart card body, said integrated circuit comprising
       a plurality of data buffers, and
       a processor configured to collect buffer status information for said plurality of data buffers, selectively re-configure said plurality of data buffers on a continual ongoing basis for storing different types of data and exchange respective types of data therewith based upon the buffer status information, re-configuring said plurality of data buffers being based upon the buffer status information, the buffer status information comprising a usage status of said plurality of data buffers including a direction in which a particular payload of data is being transferred, said processor configured to selectively re-configure at least some of said plurality of data buffers with one of the data types and exchanging invalid data with at least one of the at least some data buffers, each type of data corresponding to one of a plurality of endpoints supported by said processor, the endpoints having bandwidth allocations associated therewith, said processor being configured to further selectively re-configure said plurality of data buffers based upon the bandwidth allocations.

16. The smart card system of claim 15 wherein each endpoint is associated with one of a plurality of data transfer modes, and wherein said processor is further configured to selectively re-configure said plurality of data buffers based upon the data transfer modes.

17. The smart card system of claim 15 wherein said processor is configured to selectively re-configure at least some of said plurality of data buffers with one of the data types, and wherein said at least some data buffers are non-contiguous.

18. The smart card system of claim 15 wherein said plurality of data buffers comprises a plurality of bi-directional data buffers.

19. The smart card system of claim 15 said host device comprises at least one universal serial bus (USB) port, wherein said smart card adapter comprises a USB smart card adapter connected to said at least one USB port, and wherein said smart card comprises a USB smart card.

20. A method for buffering data in an integrated circuit for a smart card comprising a plurality of data buffers and a processor connected thereto, the method comprising:
collecting buffer status information for the plurality of data buffers;
selectively re-configuring the plurality of data buffers on a continual ongoing basis for storing different types of data and exchanging respective types of data between the plurality of data buffers and the processor based upon the buffer status information;
re-configuring the plurality of data buffers based upon the buffer status information; and
configuring the processor to select a different one of a buffering algorithm from among a plurality of buffering algorithms to selectively re-configure the plurality of data buffers based thereon;
the buffer status information comprising a usage status of the plurality of data buffers including a direction in which a particular payload of data is being transferred;
each type of data corresponding to one of a plurality of endpoints supported by the processor, the endpoints having bandwidth allocations associated therewith;
selectively re-configuring the plurality of data buffers being based upon the bandwidth allocations.

21. The method of claim 20 wherein each endpoint is associated with one of a plurality of data transfer modes, and wherein selectively re-configuring further comprises selectively re-configuring the plurality of data buffers based upon the data transfer modes.

22. The method of claim 20 wherein selectively re-configuring further comprises selectively re-configuring at least some of the plurality of data buffers with one of the data types, and wherein exchanging further comprises exchanging invalid data with at least one of the at least some data buffers.

23. The method of claim 20 wherein selectively re-configuring further comprises selectively re-configuring at least some of the plurality of data buffers with one of the data types, and wherein the at least some data buffers are non-contiguous.

24. The method of claim 20 wherein the processor operates in a universal serial bus (USB) mode.

25. An integrated circuit for a smart card comprising:
a plurality of data buffers; and
a processor configured to collect buffer status information for said plurality of data buffers, selectively re-configure said plurality of data buffers on a continual ongoing basis for storing different types of data and exchange respective types of data therewith based upon the buffer status information, re-configuring said plurality of data buffers being based upon the buffer status information;
the buffer status information comprising a usage status including a representation of an amount of utilization of said plurality of data buffers;
each type of data corresponding to one of a plurality of endpoints supported by said processor, the endpoints having bandwidth allocations associated therewith;
said processor being configured to further selectively re-configure said plurality of data buffers based upon the bandwidth allocations.

26. The integrated circuit of claim 25 wherein said processor is configured to selectively re-configure at least some of said plurality of data buffers with one of the data types, and wherein said processor is configured to exchange invalid data with at least one of the at least some data buffers.

27. A method for buffering data in an integrated circuit for a smart card comprising a plurality of data buffers and a processor connected thereto, the method comprising:
collecting buffer status information for the plurality of data buffers;
selectively re-configuring the plurality of data buffers on an ongoing basis for storing different types of data and exchanging respective types of data between the plurality of data buffers and the processor based upon the buffer status information; and
re-configuring the plurality of data buffers based upon the buffer status information;
the buffer status information comprising a usage status including a representation of an amount of utilization of the plurality of data buffers;
each type of data corresponding to one of a plurality of endpoints supported by the processor, the endpoints having bandwidth allocations associated therewith;
selectively re-configuring the plurality of data buffers being based upon the bandwidth allocations.

28. The method of claim 27 wherein selectively re-configuring further comprises selectively re-configuring at least some of the plurality of data buffers with one of the data types, and wherein exchanging further comprises exchanging invalid data with at least one of the at least some data buffers.

* * * * *